United States Patent
Montena

(10) Patent No.: US 7,264,503 B2
(45) Date of Patent: Sep. 4, 2007

(54) SEALING ASSEMBLY FOR A PORT AT WHICH A CABLE IS CONNECTED AND METHOD OF CONNECTING A CABLE TO A PORT USING THE SEALING ASSEMBLY

(75) Inventor: Noah Montena, Syracuse, NY (US)

(73) Assignee: John Mezzalingua Associates, Inc., East Syracuse, NY (US)

(*) Notice: Subject to any disclaimer, the term of this patent is extended or adjusted under 35 U.S.C. 154(b) by 480 days.

(21) Appl. No.: 10/614,487

(22) Filed: Jul. 7, 2003

(65) Prior Publication Data

US 2005/0029807 A1    Feb. 10, 2005

(51) Int. Cl.
*H01R 13/40* (2006.01)

(52) U.S. Cl. .................. 439/587; 439/585

(58) Field of Classification Search ............... 439/587, 439/585, 583, 584, 272
See application file for complete search history.

(56) References Cited

U.S. PATENT DOCUMENTS

| | | | |
|---|---|---|---|
| 3,328,746 A | 6/1967 | Schumacher |
| 3,449,706 A | 6/1969 | Carissimi |
| 3,520,342 A | 7/1970 | Scheffer |
| 3,530,425 A | 9/1970 | Vachhani |
| 3,668,612 A | 6/1972 | Nepovim |
| 3,910,673 A | 10/1975 | Stokes |
| 4,046,451 A | 9/1977 | Juds et al. |
| 4,126,170 A | 11/1978 | DeHaitre |
| 4,138,198 A | 2/1979 | Brown |
| 4,156,554 A | 5/1979 | Aujla |
| 4,173,385 A | 11/1979 | Fenn et al. |
| 4,296,950 A | 10/1981 | Chamberlin |
| 4,367,060 A | 1/1983 | Berecz |
| 4,433,889 A | 2/1984 | Ratchford et al. |
| 4,447,103 A | 5/1984 | Werth et al. |
| 4,659,272 A | 4/1987 | Pratt |
| 4,674,818 A | 6/1987 | McMills et al. |
| 4,717,355 A | 1/1988 | Mattis |
| 4,824,400 A | 4/1989 | Spinner |
| 4,869,679 A | 9/1989 | Szegda |
| 4,902,246 A | 2/1990 | Samchisen |
| 4,907,924 A | 3/1990 | Hellon |

(Continued)

OTHER PUBLICATIONS

U.S. Appl. No. 11/322,097, filed Dec. 19, 2005, inventor Montena.

*Primary Examiner*—Tulsidas C. Patel
*Assistant Examiner*—Vladimir Imas
(74) *Attorney, Agent, or Firm*—Wood, Phillips, Katz, Clark & Mortimer

(57) ABSTRACT

The combination of a first connecting assembly and a second connecting assembly. The first connecting assembly has a) a port with a central axis, a radially outwardly facing surface with threads thereon and axially spaced first and second free ends and b) an axially facing surface. The second connecting assembly has a) a tubular fitting with a central axis, axially spaced first and second ends and threads and b) a sealing assembly with a sealing portion. As an incident of axially moving the first and second connecting assemblies through cooperation of the threads on the first and second connecting assemblies, the sealing portion is deformed radially inwardly to engage sealingly with the outwardly facing surface on the port. A method of operatively connecting a cable to a port utilizes this structure.

46 Claims, 5 Drawing Sheets

U.S. PATENT DOCUMENTS

| | | | |
|---|---|---|---|
| 4,960,342 A | 10/1990 | Chi | |
| 5,011,432 A | 4/1991 | Sucht et al. | |
| 5,083,943 A | 1/1992 | Tarrant | |
| 5,127,853 A | 7/1992 | McMills et al. | |
| 5,186,655 A * | 2/1993 | Glenday et al. | 439/583 |
| 5,278,525 A | 1/1994 | Palinkas | |
| 5,283,853 A | 2/1994 | Szegda | |
| 5,284,449 A | 2/1994 | Vaccaro | |
| 5,322,454 A | 6/1994 | Thommen | |
| 5,342,096 A | 8/1994 | Bachle et al. | |
| 5,342,218 A * | 8/1994 | McMills et al. | 439/578 |
| 5,362,250 A * | 11/1994 | McMills et al. | 439/387 |
| 5,435,745 A | 7/1995 | Booth | |
| 5,454,675 A | 10/1995 | DeHaitre | |
| 5,499,934 A | 3/1996 | Jacobsen et al. | |
| 5,561,900 A | 10/1996 | Hosler, Sr. | |
| 5,571,028 A | 11/1996 | Szegda | |
| 5,651,698 A | 7/1997 | Locati et al. | |
| 5,662,489 A | 9/1997 | Stirling | |
| 5,667,405 A | 9/1997 | Holliday | |
| 5,681,189 A | 10/1997 | Dunham | |
| 5,766,037 A | 6/1998 | Nelson | |
| 5,795,188 A | 8/1998 | Harwath | |
| 5,857,865 A | 1/1999 | Shimirik et al. | |
| 5,866,849 A | 2/1999 | Tuvy et al. | |
| 5,877,452 A | 3/1999 | McConnell | |
| 5,904,587 A * | 5/1999 | Osypka et al. | 439/263 |
| 5,938,474 A | 8/1999 | Nelson | |
| 5,975,951 A * | 11/1999 | Burris et al. | 439/585 |
| 5,980,315 A | 11/1999 | Matsuda et al. | |
| 5,984,723 A | 11/1999 | Wild | |
| 5,993,254 A | 11/1999 | Pitschi et al. | |
| 6,019,636 A | 2/2000 | Langham | |
| 6,032,358 A | 3/2000 | Wild | |
| 6,053,749 A | 4/2000 | Masuda et al. | |
| 6,102,737 A | 8/2000 | Gohdes | |
| 6,210,222 B1 | 4/2001 | Langham et al. | |
| 6,234,838 B1 | 5/2001 | Wong | |
| 6,298,190 B2 | 10/2001 | Waldron et al. | |
| 6,471,545 B1 | 10/2002 | Hosler, Sr. | |
| 6,491,546 B1 | 12/2002 | Perry | |
| 6,558,194 B2 * | 5/2003 | Montena | 439/585 |
| 6,592,403 B2 | 7/2003 | Kooiman | |
| 6,676,446 B2 * | 1/2004 | Montena | 439/583 |
| 6,692,300 B2 | 2/2004 | Kanda et al. | |
| 6,884,113 B1 | 4/2005 | Montena | |
| 6,929,265 B2 | 8/2005 | Holland et al. | |
| 7,097,500 B2 | 8/2006 | Montena | |
| 2003/0211778 A1* | 11/2003 | Burris et al. | 439/587 |
| 2004/0082218 A1* | 4/2004 | Stirling | 439/587 |
| 2005/0176294 A1 | 8/2005 | Montena | |

\* cited by examiner

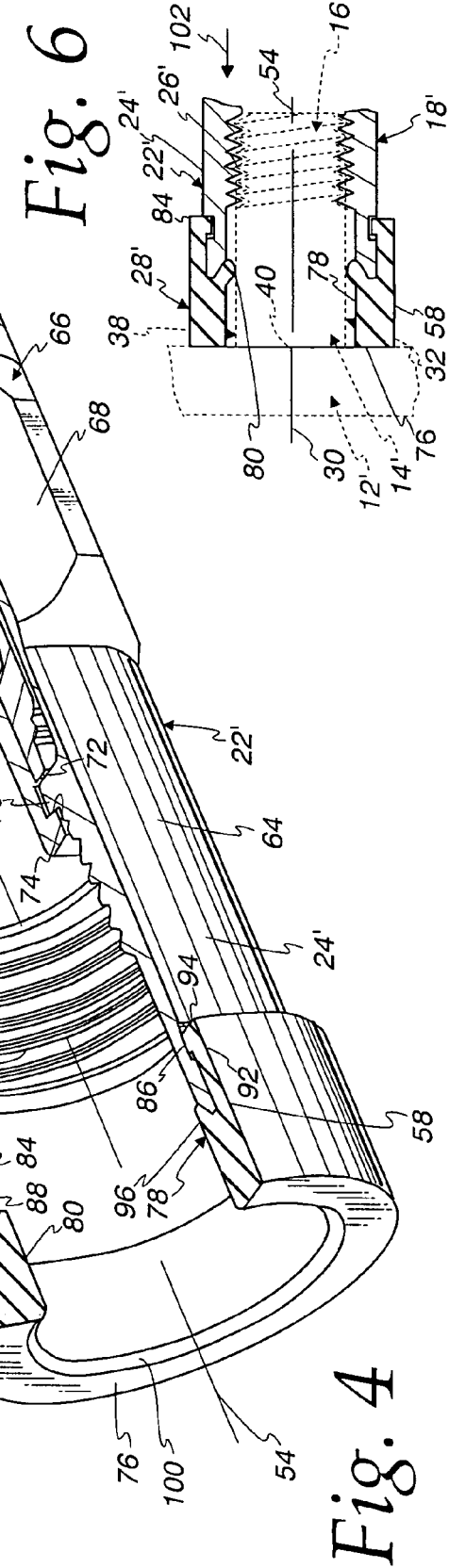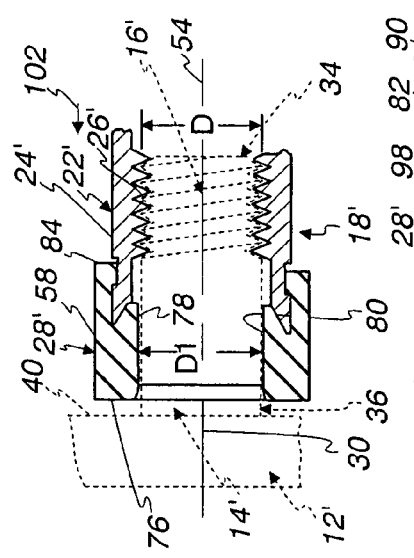

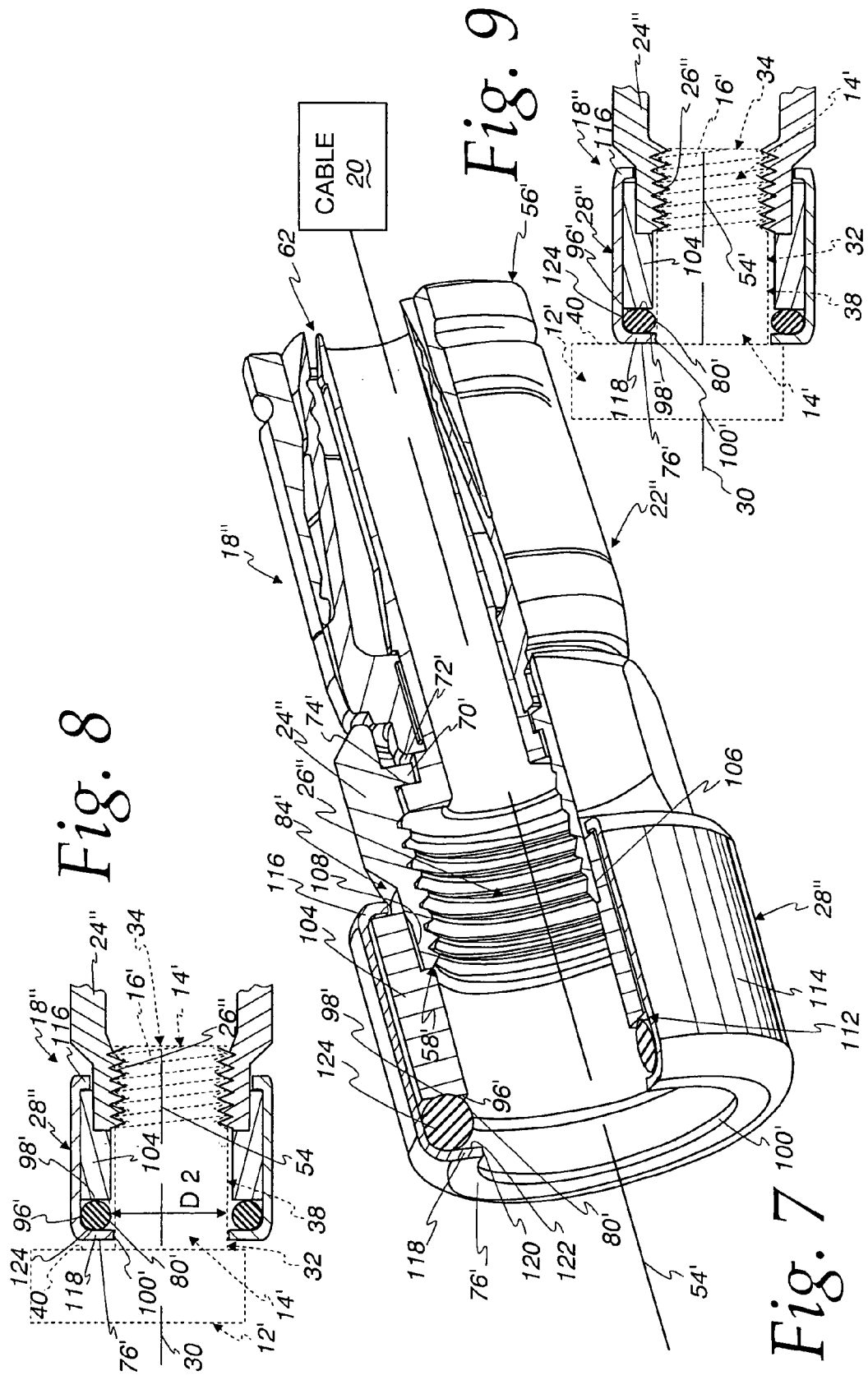

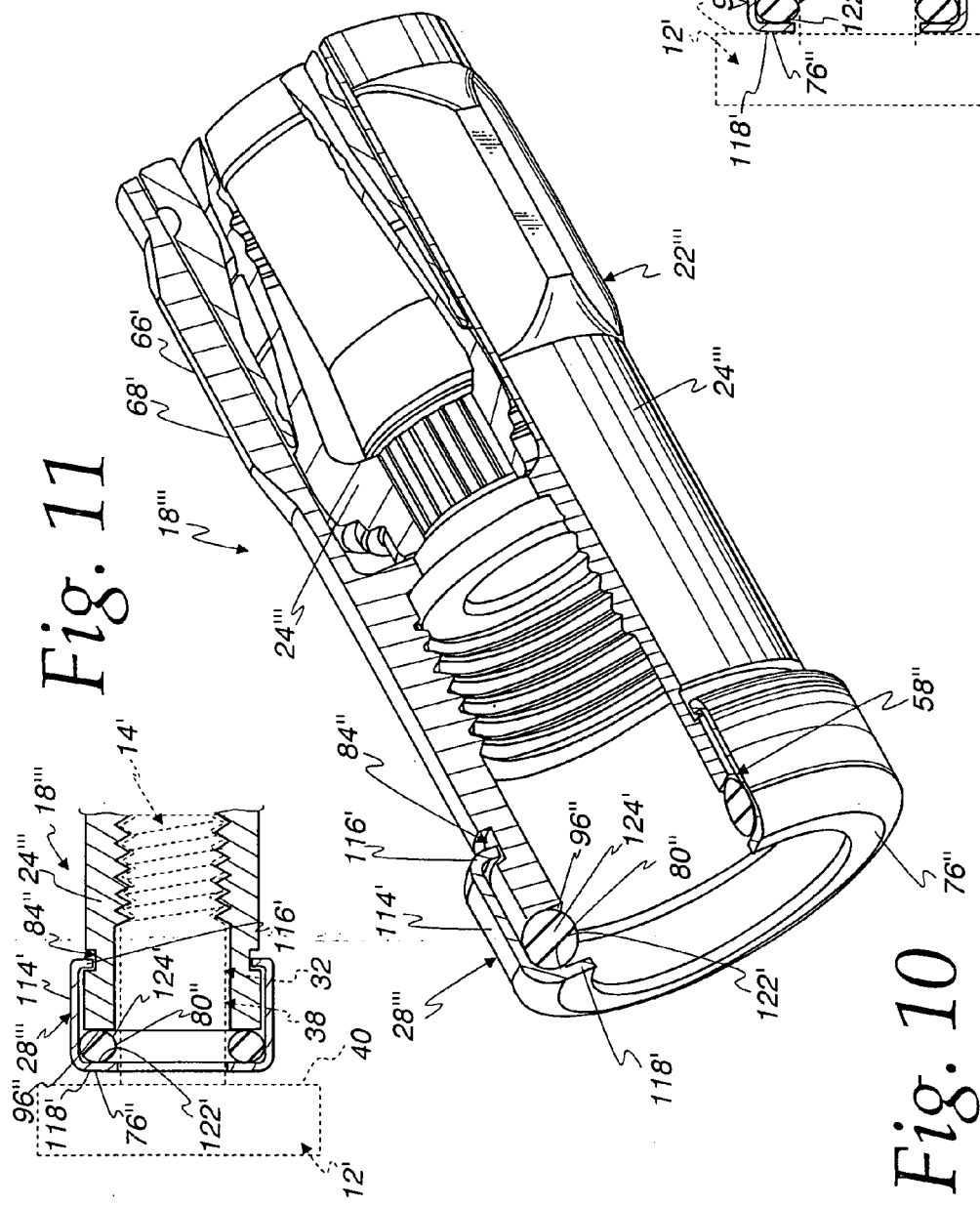

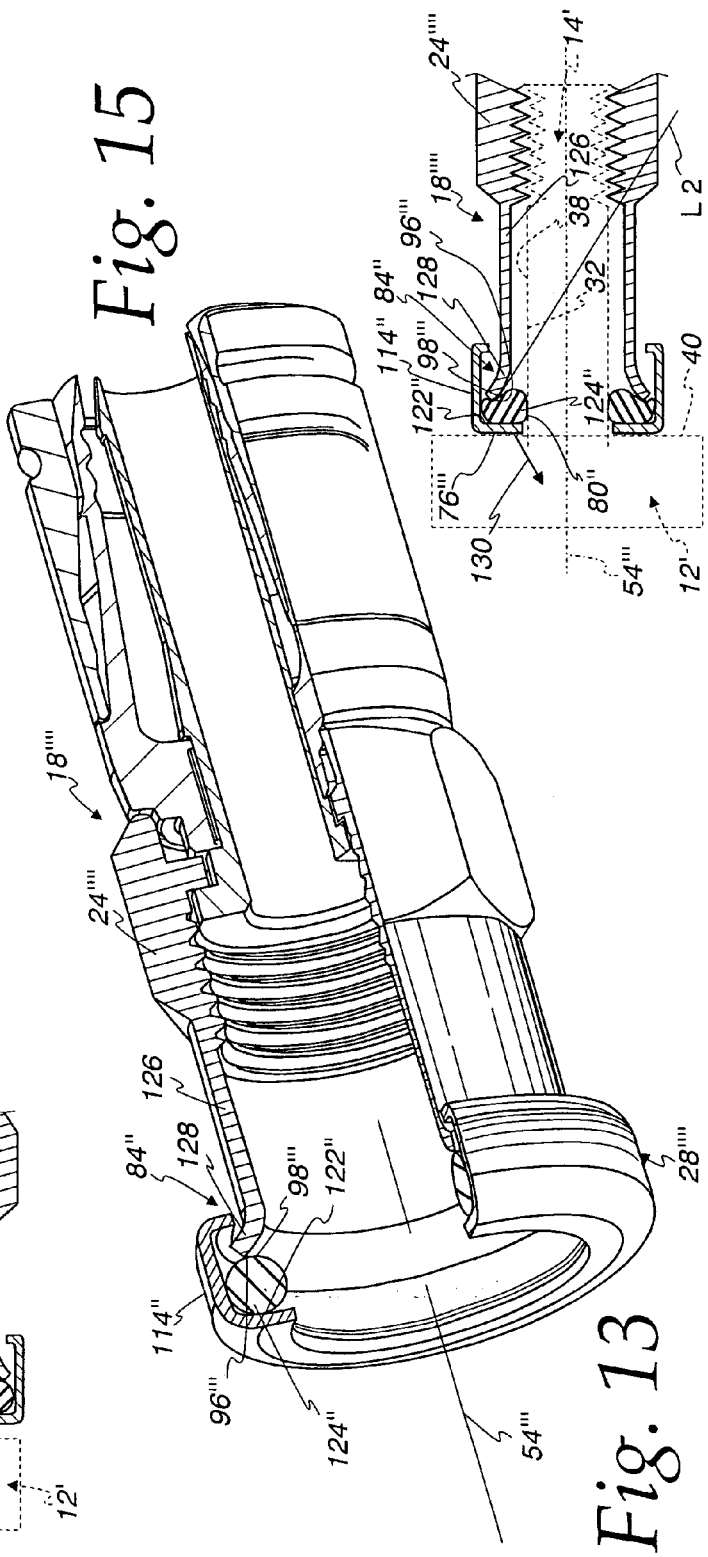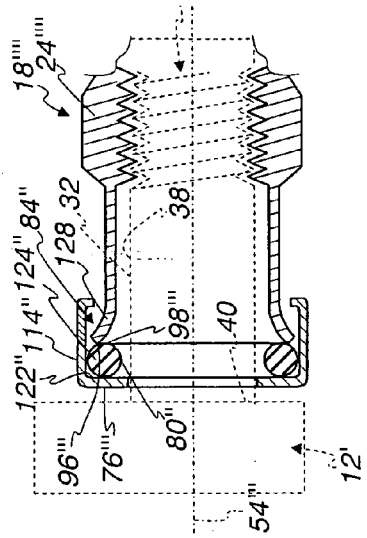

SEALING ASSEMBLY FOR A PORT AT WHICH A CABLE IS CONNECTED AND METHOD OF CONNECTING A CABLE TO A PORT USING THE SEALING ASSEMBLY

BACKGROUND OF THE INVENTION

1. Field of the Invention

This invention relates to a connecting assembly through which a cable is operatively connected to a port and, more particularly, to a sealing assembly which is used to avoid exposure of the port region to environmental conditions. The invention is also directed to a method of connecting a cable to a port utilizing the sealing assembly.

2. Background Art

Myriad connecting assemblies are currently available for connecting a cable, such as a coaxial cable, to an externally threaded connecting part, hereinafter referred to as a "port". The nature of the structure associated with the port may vary considerably. As just examples, the port may be located at a drop or splice location.

Commonly, CATV distribution systems are set up so that cable connections are established at ports outside of the home or business. Most commonly, the cable is provided with an end connector that is internally threaded to mate with external threads on the port. Typically, the end connector and port are made from metal. The threaded metal interface is exposed to potentially many different environmental conditions. For example, these systems are commonly exposed to road salt, water, ozone, etc., which may migrate between the threaded surfaces and corrode the same, as may impair, or make impossible, the normal disconnection process effected commonly by rotating an element on the cable end connector relative to the port. This condition may also degrade the electrical ground continuity through the connector, and the ability of that connection to pass RF signal without creating electrical interferences known as "common path distortions".

It is known to address this problem by utilizing weather seals or "boots", such as that shown in U.S. Pat. No. 5,866,849, to Tuvy et al (Tuvy). Tuvy discloses an element which can be separately attached on site to the cable end connector so as to block migration of foreign matter between the cooperating threads. Separate seals of different construction are also currently available on the market. Additionally, silicone greases and caulks are commonly used for this purpose.

However, there is a tendency of installers to forego use of any type of sealing arrangement, regardless of its form, that requires a separate installation step. This omission of the seal may be done out of ignorance, or intentionally for purposes of simplicity and/or to increase the speed of installation. Installers may intentionally forego installation of the seal even though they may be specifically trained and instructed to install the seal. The common result of omitting the sealing structure is that unnecessary service calls may be required, which is a direct result of corrosion damage to the ground contact and an equipment port. Service calls are costly and also represent an irritant to consumers. As a result of this inconvenience, consumers may choose to change service providers.

Since many system operators do not feel it is practical to enforce the requirement to install weather seals, the industry has contended with the above problems. The industry continues to search for a seal design that will not impede or lengthen the installation process and one which will be consistently used and reliably seal the threaded connections at ports.

SUMMARY OF THE INVENTION

In one form, the invention is directed to the combination of a first connecting assembly and a second connecting assembly. The first connecting assembly has a port with a central axis, a radially outwardly facing surface, a first free end and a second end spaced axially from the first free end. The port has threads on the radially outwardly facing surface. The first connecting assembly further has an axially facing surface. The second connecting assembly is used to operatively connect a cable to the port on the first connecting assembly. The second connecting assembly has a tubular fitting with a central axis and axially spaced first and second ends. The tubular fitting defines a receptacle for a cable at the first end of the tubular fitting. The tubular fitting further has a threaded element with threads which can be engaged with threads on the port to maintain the first and second connecting assemblies operatively engaged and thereby a cable in the receptacle in the tubular fitting operatively connected to the port. The second connecting assembly further includes a sealing assembly. The first and second connecting assemblies are operatively engageable by i) relatively situating the first and second connecting assemblies in a pre-assembly state wherein the first and second connecting assembles are separated from each other; ii) relatively moving the first and second connecting assembles axially from the pre-assembly state to engage the threads on the port and threaded element; and iii) rotating at least one of the port and threaded element relative to the other of the port and threaded element to cause the threads on the port and threaded element to interact and thereby cause the threaded element to move axially relative to the port in a first direction from the first free end towards the second end of the port into a secured position. The sealing assembly has a first sealing surface that abuts to the axially facing surface on the first connecting assembly with the threaded element in the secured position. The sealing assembly has a sealing portion with a second sealing surface. The sealing portion has a first state and a deformed state. The sealing portion is caused to be changed from the first state into the deformed state and the second sealing surface is thereby caused to be moved sealingly radially inwardly against a radially outwardly facing surface on the port as an incident of the threaded element moving in the first axial direction with the first sealing surface abutted to the axially facing surface of the first connecting assembly. The sealing assembly and tubular fitting are maintained together as a unitary assembly with the second connecting assembly separated from the first connecting assembly.

In one form, the sealing assembly defines first and second axially oppositely facing shoulders. The tubular fitting defines third and fourth oppositely facing shoulders. The first shoulder confronts the third shoulder to confine relative movement between the sealing assembly and tubular fitting in an axial direction towards each other. The second shoulder confronts the fourth shoulder to confine relative movement between the sealing assembly and tubular fitting in an axial direction away from each other.

In one form, the tubular fitting has a radially outwardly opening annular groove and the sealing assembly has a radially inwardly projecting bead which extends into the annular groove.

In one form, the sealing assembly is at the second end of the tubular fitting.

In one form, the first and second sealing surfaces are both spaced axially fully from the threads on the threaded element.

The invention is further directed to the combination of a first connecting assembly and a second connecting assembly. The first connecting assembly has a port with a central axis, a radially outwardly facing surface, a first free end, and a second end spaced axially from the first free end. The port has threads on the radially outwardly facing surface. The first connecting assembly further has an axially facing surface. The second connecting assembly is useable to operatively connect a cable to the port on the first connecting assembly. The second connecting assembly has a tubular fitting with a central axis and axially spaced first and second ends. The tubular fitting defines a receptacle for a cable at the first end of the tubular fitting. The tubular fitting further has a threaded element with threads that can be engaged with the threads on the port to maintain the first and second connecting assemblies operatively engaged and thereby a cable in the receptacle in the tubular fitting operatively connected to the port. The threads on the threaded element bound a first effective diameter. The second connecting assembly further includes a sealing assembly. The first and second connecting assemblies are operatively engageable by i) relatively situating the first and second connecting assemblies in a pre-assembly state wherein the first and second connecting assemblies are separated from each other; ii) relatively moving the first and second connecting assemblies axially from the pre-assembly state to engage the threads on the port and threaded element; and iii) rotating at least one of the port and threaded element relative to the other of the port and threaded element to cause the threads on the port and threaded element to interact and thereby cause the threaded element to move axially relative to the port in a first direction from the first free end towards the second end of the port into a secured position. The sealing assembly has a first sealing surface that abuts to the axially facing surface on the first connecting assembly with the threaded element in the secured position. The sealing assembly has a sealing portion with a second sealing surface. The sealing portion has a first state and a deformed state. The second sealing surface has an inside effective diameter that is greater than the first effective diameter with the sealing portion in the first state. The sealing portion is caused to be changed from the first state into the deformed state and the second sealing surface is thereby caused to be moved sealingly radially inwardly against the radially outwardly facing surface on the port as an incident of the threaded element moving in the first axial direction with the first sealing surface abutted to the axially facing surface of the first connecting assembly.

In one form, the second sealing surface has an unthreaded, continuous, annular shape.

In one form, the threads on the port have a second effective diameter with the sealing portion in the first state and the inside effective diameter is greater than the second effective diameter.

In one form, the tubular fitting has a first surface and the sealing assembly has a second surface and with the first sealing surface abutted to the axially facing surface of the first connecting assembly, continued movement of the threaded element in the first axial direction causes the first and second surfaces to interact to thereby change the sealing portion from the first state into the deformed state.

In one form, at least one of the first and second surfaces, as viewed in cross section in the plane extending through the central axis of the tubular fitting, has a straight shape extending along a line that is not parallel to the central axis of the tubular fitting.

In one form, the threaded element has a first cam surface and the sealing element has a second cam surface. With the first sealing surface abutted to the axially facing surface of the first connecting assembly, continued movement of the threaded element in the first axial direction causes the first and second cam surfaces to interact so as to exert a radially inward force on the sealing portion as the sealing portion is changed from the first state into the deformed state.

The sealing portion may be an O-ring.

In one form, the sealing assembly has a third surface and with the first sealing surface abutted to the axially facing surface of the first connecting assembly, continued movement of the threaded element in the first axial direction causes the sealing portion to be compressed between the first and third surfaces so as to expand radially inwardly to cause the second sealing surface to be moved radially inwardly sealingly against the radially outwardly facing surface on the port.

In one form, the sealing assembly has a wall and the first sealing surface and third surface are defined by the wall and face axially oppositely to each other.

The first and second sealing surfaces may be defined by a single piece or by separate, discrete elements.

In one form, the sealing assembly and tubular fitting are maintained together as a unitary assembly with the second connecting assembly separated from the first connecting assembly.

In one form, the sealing assembly defines first and second axially oppositely facing shoulders. A tubular fitting defines third and fourth oppositely facing shoulders. The first shoulder confronts the third shoulder to confine relative movement between the sealing assembly and tubular fitting in an axial direction towards each other. The second shoulder confronts the fourth shoulder to confine relative movement between the sealing assembly and the tubular fitting in an axial direction away from each other.

In one form, the tubular fitting has a radially outwardly opening annular groove and the sealing assembly has a radially inwardly projecting bead which extends into the annular groove.

In another form, the invention is directed to the combination of a first connecting assembly and a second connecting assembly. The first connecting assembly has a port with a central axis, a radially outwardly facing surface, a first free end, and a second end spaced axially from the first free end. The port has threads on the radially outwardly facing surface. The first connecting assembly further has an axially facing surface. The second connecting assembly is operable to connect a cable to the port on the first connecting assembly. The second connecting assembly has a tubular fitting with a central axis and axially spaced first and second ends. The tubular fitting defines a receptacle for a cable at the first end of the tubular fitting. The tubular fitting has a threaded element with threads which can be engaged with the threads on the port to maintain the first and second connecting assembles operatively engaged and thereby a cable in the receptacle in the tubular fitting operatively connected to the port. The second connecting assembly includes a sealing assembly. The first and second connecting assemblies are operatively engageable by i) relatively situating the first and second connecting assemblies in a pre-assembly state wherein the first and second connecting assemblies are separated from each other; ii) relatively moving the first and second connecting assemblies axially from the pre-assembly state to engage the threads on the port and threaded element; and iii) relatively rotating at least one of the port and threaded element relative to the other of the port and threaded element to cause the threads on the port and threaded element to interact and thereby cause the threaded element to move axially relative to the port in a first direction from the first free end towards the second end of the port into a secured position. The sealing assembly has a sealing portion with a first sealing surface. The sealing portion has a first state and a deformed state. The tubular fitting has a first surface and the sealing assembly has a second surface. At least one of the first and second surfaces is angled relative to the central axis so that as the threaded element is moved in the first axial direction, the first and second surfaces cooperate to cause the first sealing surface to be wedged radially inwardly sealingly to against the radially outwardly facing surface on the port as the sealing element is caused to be changed from the first state into the deformed state.

In one form, the sealing portion includes an O-ring.

In one form, the sealing assembly has a second sealing surface which is abuttable to the axially facing surface of the first connecting assembly.

The first and second sealing surfaces may be defined by a single piece or by separate discrete elements.

In one form, the sealing assembly and tubular fitting are maintained together as a unitary assembly with the second connecting assembly separated from the first connecting assembly.

The invention is further directed to the combination of a first connecting assembly and a second connecting assembly. The first connecting assembly has a port with a central axis, a radially outwardly facing surface, a first free end, and a second end spaced axially from the first free end. The port has threads on the radially outwardly facing surface. The first connecting assembly further has an axially facing surface. The second connecting assembly is useable to operatively connect a cable to the port on the first connecting assembly. The second connecting assembly has a tubular fitting with a central axis and axially spaced first and second ends. The tubular fitting defines a receptacle for a cable at the first end of the tubular fitting. The tubular fitting further has a threaded element with threads that can be engaged with the threads on the port to maintain the first and second connecting assemblies operatively engaged and thereby a cable in the receptacle in the tubular fitting operatively connected to the port. The second connecting assembly further includes a sealing assembly. The first and second connecting assemblies are operatively engageable by i) relatively situating the first and second connecting assemblies in a pre-assembly state where the first and second connecting assemblies are separated from each other; ii) relatively moving the first and second connecting assemblies axially from the pre-assembly state to engage the threads on the port and threaded element; and iii) relatively rotating at least one of the port and threaded element relative to the other of the port and threaded element to cause the threads on the port and threaded element to interact and thereby cause the threaded element to move axially relative to the port in a first direction from the first free end towards the second end of the port into a secured position. The sealing assembly has a first sealing surface that abuts to the axially facing surface on the first connecting assembly with the threaded element in the secured position. The sealing element has a sealing portion with a second sealing surface. The sealing portion has a first state and a deformed state. The sealing portion is caused to be changed from the first state into the deformed state and the second sealing surface is thereby caused to be moved radially inwardly sealingly against the radially outwardly facing surface on the port as an incident of the threaded element moving in the first axial direction with the first sealing surface abutted to the axially facing surface of the first connecting assembly. The tubular fitting has a first surface. As the threaded element is moved in the first axial direction with the first sealing surface abutted to the axially facing surface of the first connecting assembly, the sealing portion of the sealing assembly is compressed between the first surface and the axially facing surface of the first connecting assembly so as to expand and thereby cause the second sealing surface to be moved radially inwardly sealingly against the radially outwardly facing surface on the port.

In one form, the sealing assembly has a wall which is abuttable to the axially facing surface of the first connecting assembly. The wall has a third surface facing oppositely to the axially facing surface of the first connecting assembly. The sealing portion of the sealing assembly is compressed between the first and third surfaces as the second sealing surface is caused to be moved radially inwardly sealingly against the radially outwardly facing surface on the port.

In one form, at least one of the first and second surfaces, as viewed in cross section in a plane extending through the central axis of the tubular fitting, has a straight shape extending along a line that is not parallel to the central axis of the tubular fitting.

In one form, the sealing portion may include an O-ring.

The first and second sealing surfaces may be defined by a single piece or by first and second, separate, discrete elements.

In one form, the sealing assembly and tubular fitting are maintained together as a unitary assembly with the second connecting assembly separated from the first connecting assembly.

The invention is still further directed to the combination of a first connecting assembly and second connecting assembly. The first connecting assembly has a port with a central axis, a radially outwardly facing surface , a first free end, and a second end spaced axially from the first free end. The port has threads on the radially outwardly facing surface. The first connecting assembly further has an axially facing surface. The second connecting assembly is useable to operatively connect the cable to the port on the first connecting assembly. The second connecting assembly has a tubular fitting with a central axis and axially spaced first and second ends. The tubular fitting defines a receptacle for a cable at the first end of the tubular fitting. The tubular fitting further has a threaded element with threads that can be engaged with the threads on the port to maintain the first and second connecting assemblies operatively engaged and thereby a cable in the receptacle in the tubular fitting operatively connected to the port. The first and second connecting assemblies cooperate to cause the sealing portion to be deformed radially inwardly to sealingly engage the radially outwardly facing surface on the port and the sealing assembly to sealingly engage the axially facing surface on the first connecting assembly as an incident of the threaded element and port being relatively rotated to cause the threaded element to advance in a first axial direction from the first free end of the port towards the second end of the port.

The invention is still further directed to a method of operatively connecting a cable to a port. The method includes the steps of: providing a first connecting assembly having a) a port with a central axis, a radially outwardly facing surface having threads thereon, a first free end, and a second end spaced axially from the first free end, and b) an axially facing surface; providing a second connecting assembly having a) a tubular fitting with a central axis and axially spaced first and second ends and having a threaded element with threads and b) a sealing assembly having a sealing portion; aligning the first and second connecting assemblies in a pre-assembly state with the first and second connecting assemblies separated from each other; relatively axially moving the first and second connecting assemblies to engage the threads on the port and the tubular fitting; rotating at least one of the port and threaded element relative to the other of the port and threaded element to cause the threads to interact and thereby cause the threaded element to move axially relative to the port in a first direction from the first free end towards the second end; and as an incident of moving the threaded element axially in the first direction, causing the sealing portion to be deformed radially inwardly to engage sealingly with the radially outwardly facing surface of the port.

The method may further include the step of causing the sealing assembly to sealingly engage the axially facing surface on the first connecting assembly as an incident of moving the threaded element axially in the first direction.

In one form, the step of causing the sealing portion to be deformed radially inwardly involves causing the sealing portion to be changed from a) a first state wherein the sealing surface is spaced from the outwardly facing surface on the port into b) a deformed state wherein the sealing surface is pressed against the outwardly facing surface on the port.

In one form, the step of causing the sealing portion to be deformed radially inwardly involves producing a compressive axial force on the sealing portion to cause the sealing portion to deform radially inwardly.

In one form, the step of causing the sealing portion to be deformed radially inwardly involves producing an axial compressive force on the sealing portion between the second connecting assembly and a part of the sealing assembly.

In one form, the step of providing a second connecting assembly comprises providing a tubular fitting and a sealing assembly that are maintained together as a unitary assembly with the second connecting assembly separated from the first connecting assembly.

BRIEF DESCRIPTION OF THE DRAWINGS

FIG. 4 is a fragmentary, perspective view of one form of the second connecting assembly, according to the present invention, and including a tubular fitting connected to a cable through a threaded element and one form of sealing assembly which cooperates between the tubular fitting and the first connecting assembly;

FIG. 5 is a fragmentary, cross-sectional view of the sealing assembly on the tubular fitting in FIG. 4 with the threads on the threaded element engaged with the port on a first connecting assembly, shown in phantom lines, and being moved towards a secured position;

FIG. 6 is a view as in FIG. 5, with the threaded element moved fully to the secured position and the sealing element sealing between the tubular fitting and first connecting assembly;

FIG. 7 is a view as in FIG. 4 of a modified form of tubular fitting and sealing assembly, according to the present invention;

FIG. 8 is a view corresponding to that in FIG. 5 wherein the threaded element in FIG. 7 on the tubular fitting is being moved towards a secured position;

FIG. 9 is a view as in FIG. 6 with the threaded element in FIG. 7 in the secured position and with the sealing assembly sealing between the tubular fitting and first connecting assembly;

FIG. 10 corresponds to FIG. 4 and shows a still further modified form of tubular fitting and sealing assembly, according to the present invention;

FIG. 11 is a view corresponding to that in FIG. 5 wherein the threaded element in FIG. 10 is being moved towards a secured position;

FIG. 12 is a view corresponding to that in FIG. 6 with the threaded element in FIG. 10 in the secured position and with the sealing assembly sealing between the tubular fitting and first connecting assembly;

FIG. 13 corresponds to FIG. 4 and shows a still further modified form of tubular fitting and sealing assembly, according to the present invention;

FIG. 14 is a view corresponding to that in FIG. 5 wherein the threaded element in FIG. 13 is being moved towards a secured position; and FIG. 15 is a view corresponding to that in FIG. 6 with the threaded element in FIG. 13 in the secured position and with the sealing assembly sealing between the tubular fitting and first connecting assembly.

DETAILED DESCRIPTION OF THE DRAWINGS

Figure 1:
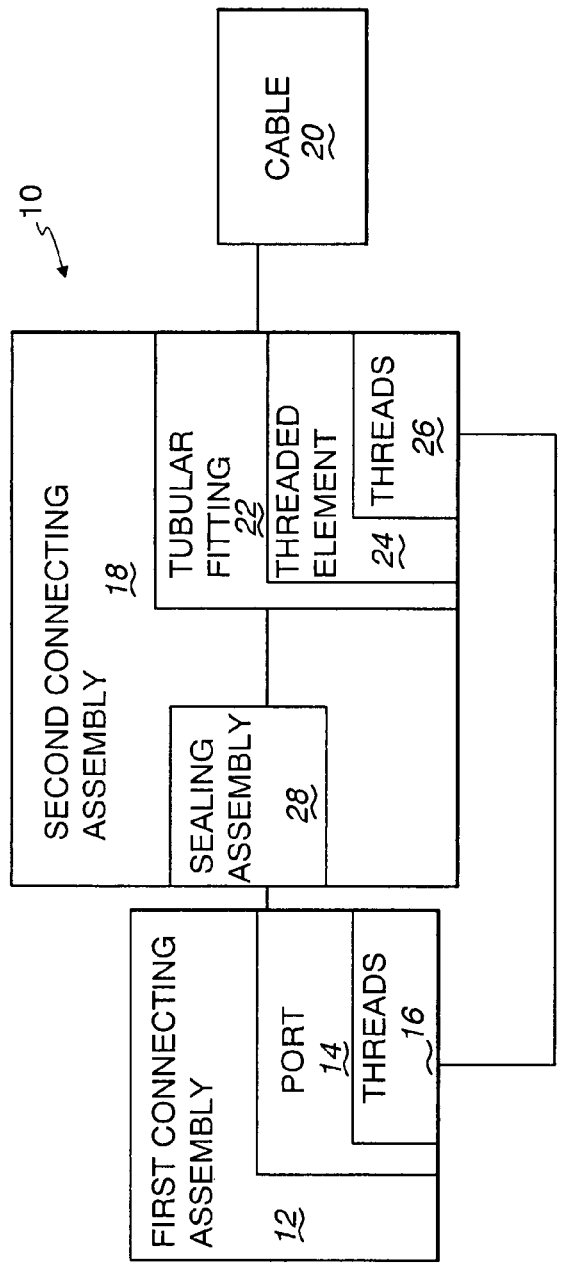
FIG. 1 is a schematic representation of a first connecting assembly, including a threaded port, and a second connecting assembly for operatively connecting a cable to the port on the first connecting assembly, according to the present invention.

In FIG. 1, one form of the inventive system is shown generically at 10. The system 10 consists of a first connecting assembly 12 having a port 14 with threads 16 thereon. A second connecting assembly 18 operatively connects a cable 20 to the port 14 on the first connecting assembly 12. The second connecting assembly 18 consists of a tubular fitting 22 which receives the cable 20. The tubular fitting 22 has a threaded element 24 having threads 26 which are engageable with the threads 16 on the first connecting assembly 12. A sealing assembly 28 acts between the tubular fitting 22 and first connecting assembly 12. The sealing assembly 28 prevents migration of foreign matter between the threads 16, 26 on the first and second connecting assemblies 12, 18.

The invention is focused primarily on the sealing assembly 28 and its cooperation between the first connecting assembly 12 and tubular fitting 22. The sealing assembly 28 is shown in a generic environment in that the invention contemplates, among other things, incorporation into virtually any system in which a cable 20 is connected to a threaded port, be it at a splice connection, a drop connection, etc. While several embodiments of the first and second connecting assemblies 12, 18 will be described below, the embodiments are only exemplary in nature, as the invention contemplates variations in the structure shown in terms of the configuration of the tubular fitting 22, threaded element 24, sealing assembly 28, etc.

Figure 2:
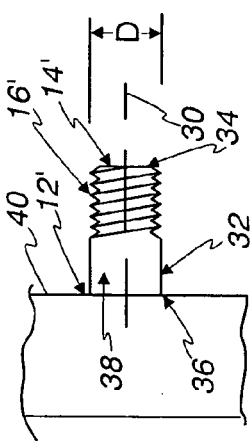
FIG. 2 is a fragmentary, elevation view of one form of threaded port on the first connecting assembly, usable according to the present invention.

An exemplary first connecting assembly is shown in FIG. 2 at 12'. The first connecting assembly 12' consists of a cylindrical port 14'. The port 14' has a central axis 30, a radially outwardly surface 32, a first free end 34, and a second end 36 spaced axially from the first free end 34. The port 14' has threads 16' on the outwardly facing surface 32 and extending from the first free end 34 partially along the axial length of the port 14', so as to define an unthreaded portion 38 on the outwardly facing surface 32. The port 14' projects from a flat, axially facing surface 40.

Figure 3:
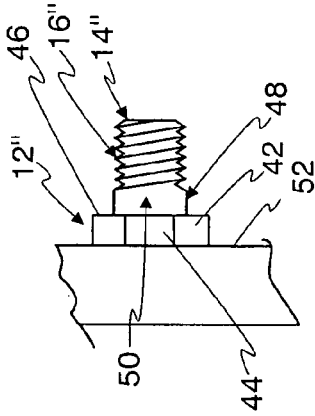
FIG. 3 is a view as in FIG. 2 showing another form of threaded port, usable according to the present invention.

An alternative form of first connecting assembly is shown at 12" in FIG. 3. The first connecting assembly 12" differs from the first connecting assembly 12' by reason of differences between the construction of the port 14" and the port 14' shown in FIG. 2. The port 14" has a raised, annular portion 42 with a surface 44 that may be flatted to accommodate a conventional wrench that may be used to install the port 14". The raised annular portion 42 has an axially facing surface 46 from which the cylindrical portion 48 of the port 14" projects. The cylindrical portion 48 has threads 16" along a portion of the axial extent thereof and an unthreaded portion 50, corresponding to the unthreaded portion 38 on the first connecting assembly 12' in FIG. 2. The first connecting assembly 12" has a surface 52 facing axially in the same direction as the surface 46.

Referring now to FIGS. 4–6, one form of the second connecting assembly, according to the present invention, is shown at 18'. The second connecting assembly 18' will be shown and described principally as it cooperates with the first connecting assembly 12'. However, the second connecting assembly 18' is capable of cooperating with the first connecting assembly 12" in FIG. 3 in substantially the same manner.

The second connecting assembly 18' consists of a tubular fitting 22' having a central axis 54 and axially spaced first and second ends 56, 58, respectively. The tubular fitting 22' defines a receptacle 60 for the cable 20 at the first end 56 of the tubular fitting 22'. The tubular fitting 22' has a cylindrical, threaded element 24', which has internal threads 26' which can be engaged with the threads 14', 14" on the first connecting assemblies 12', 12" to maintain the second connecting assembly 18' and first connecting assemblies 12', 12" operatively engaged, whereby the cable 20 is operatively connected to the ports 14', 14".

The structure at 62 at the first end 56 of the tubular fitting 22', for maintaining the cable 20 operatively connected to the tubular fitting 22', will not be described in detail herein. The particular structure used may vary considerably and the particular structure used does not impact the present invention. The operation of this structure 62 is described more fully in U.S. Pat. No. 6,153,830, which is incorporated herein by reference. It suffices to say that the structure 62, in the state shown in FIG. 4, securely maintains the cable 20 in a fixed position relative to the tubular fitting 22'.

The threaded element 24' consists of a cylindrical body 64 with a radially enlarged portion 66 adjacent to the first end 56 of the tubular fitting 22'. The radially enlarged portion 66 has a polygonally-shaped outer surface 68 which accommodates a conventional wrench, which can be used to rotate the threaded element 24' around the axis 54. A radially inwardly projecting, annular bead 70 resides between axially oppositely facing surfaces 72, 74 so as to be confined thereby against movement axially oppositely relative to the structure 62. This arrangement allows the threaded element 24' to be rotated guidingly relative to the structure 62 at a fixed axial location. The threaded element 24' extends from the radially enlarged portion 66 continuously to and past the threads 26' to the second end 58 of the tubular fitting 22'. A first form of sealing assembly 28' is attached at the free, second end 58 of the tubular fitting 22'.

In this embodiment, the sealing assembly 28' has a single piece that defines a first, annular, sealing surface 76 and a sealing portion 78 defining a second sealing surface 80. The first sealing surface 76 faces axially, with the second sealing surface 80 having an annular shape, facing radially inwardly. The sealing assembly 28' has an annular receptacle 82 for receiving the second free end 58 of the tubular fitting 22'.

The sealing assembly 28' and threaded element 24' are configured to be maintained together as a unitary assembly with the second connecting assembly 18' fully separated from the first connecting assemblies 12', 12". To accomplish this, the threaded element 24' has a radially outwardly opening, annular groove 84 into which a radially inwardly projecting bead 86 on the sealing assembly 28' extends. The bead 86 has first and second axially oppositely facing shoulders 88, 90. The groove 84 is bounded by oppositely facing third and fourth annular shoulders 92, 94. The first shoulder 88 confronts the third shoulder 92 to confine relative movement between the sealing assembly 28' and threaded element 24' axially towards each other. The second and fourth shoulders 90, 94 cooperate to confine relative movement between the sealing assembly 28' and threaded element 24' away from each other. The axial extent of the bead 86 is slightly less than that of the groove 84 so that a modicum of relative axial movement is permitted between the sealing assembly 28' and threaded element 24' as the sealing assembly 28' is reconfigured, as hereinafter explained.

The second end 58 of the tubular fitting 22' nests snugly in the receptacle 82 with the bead 86 extended into the groove 84. In this position, a first cam surface 96 on the threaded element 24' facially abuts to a second cam surface 98 on the sealing assembly 28'. With the first and second cam surfaces 96, 98 viewed in cross section in a plane extending through the axis 54, as shown in FIG. 4, the first and second cam surfaces 94, 98 have a straight shape extending along a line L that is non-parallel to the axis 54. The cam surfaces 96, 98 and axis 54 make an acute angle that opens axially oppositely to an axial assembly direction for the tubular fitting 22'.

The second connecting assembly 18' can be connected to the first connecting assembly 12' either with the cable 20 fixed to the tubular fitting 22' through the structure 62, or without the cable 20 present. In the latter case, the cable 20 can be installed after the first and second connecting assemblies 12', 18' are joined. Referring additionally to FIG. 5, the first and second connecting assemblies 12', 18' can be placed in a separated, pre-assembly state, wherein the axes 30, 54 are coincident, after which the first and second connecting assemblies 12', 18' can be moved axially towards each other, whereby the port 14' is introduced at the entry opening 100 of the sealing assembly 28'. Continued axial movement causes the threads 16', 26' to engage. In this embodiment, the effective diameter D (see FIGS. 2 and 5) defined by the threads 16' is less than the diameter D1 for the unthreaded, annular, second sealing surface 80. Accordingly, the port 14' can be directed through the entry opening 100 into engagement with the threads 26' without interference between the port 14' and the sealing assembly 28'.

With the threads 16', 26' initially engaged, the first sealing surface 76 remains spaced from the axially facing surface 40 on the first connecting assembly 12'. By then rotating the threaded element 24' around the axis 54, the threads 16, 26' interact to cause the threaded element 24' to move axially relative to the port 14' in the direction of the arrow 102 in a direction from the first free end 34 of the port 14' towards the second end 36. As the threaded element 24 is rotated further, the first sealing surface 76 contacts the axially facing surface 40 on the first connecting assembly 12'.

At the moment of initial contact between the surfaces 76, 40, the sealing portion 78 of the sealing assembly 28' is in a first state, as shown in FIGS. 4 and 5. At this point, continued rotation of the threaded element 24' causes the first cam surface 96 on the threaded element 24' to be born forcibly against the second cam surface 98 on the sealing assembly 28', with the sealing assembly 28' blocked against the axially facing surface 40. This action causes a positive seal to be developed between the first sealing surface 76 and the axially facing surface 40, and at the same time causes the cam surfaces 96, 98 to interact so that the sealing portion 78 is wedged radially inwardly in the vicinity of the cam surfaces 96, 98 by reason of the one of the surface 98 being angled and a force being exerted directly thereon by the surface 96. As the threaded element 24' achieves a secured position, as seen in FIG. 6, the sealing portion 78 assumes a deformed state, wherein the second sealing surface 80 is moved radially inwardly against the radially outwardly facing surface 32 on the port 14' at the unthreaded portion 38. With the threaded element 24' tightened to the secured position, shown in FIG. 6, the first sealing surface 76 is positively borne against the axially facing surface 40, fully around the axis 54, and the second sealing surface 80 positively seals fully around the unthreaded portion 38 of the port 14'. With this arrangement, all potential paths of egress of foreign material to between the threads 16', 26' are positively blocked by the threaded element 24', and the sealing assembly 28' cooperating therewith.

The second connecting assembly 18' is capable of cooperating with the first connecting assembly 12" in FIG. 3 in the same manner. The first sealing surface 26 may be dimensioned to engage either the axially facing surface 46 on the raised annular portion 42, or the axially facing surface 52, corresponding to the surface 40 on the first connecting assembly 12' in FIG. 2.

With the second connecting assembly 18' shown in FIGS. 4–6, only two non-standard parts are required, the sealing assembly 28' and the specially formed threaded element 24'. These parts may be applied to an ordinary f connector construction. The sealing assembly 28' can be snap fit at the time of manufacture to the threaded element 24' to define the unitary construction for the sealing assembly 28' and threaded element 24', as previously described. Thus, the use of the sealing assembly 28' is not left to the judgment of a particular installer.

Another form of the second connecting assembly, according to the present invention, is shown at 18" in FIGS. 7–9. FIGS. 7–9 correspond consecutively to FIGS. 4–6. The second connecting assembly 18" has a number of elements corresponding to those shown for the second connecting assembly 18' in FIGS. 4–6. Corresponding numbers are used on like parts.

The second connecting assembly 18" has a tubular fitting 22" with spaced first and second ends 56', 58'. The tubular fitting 22" incorporates the structure 62 previously described for joining to the cable 20. The tubular fitting 22" includes a threaded element 24" which has internal threads 26". The threaded element 24" has an annular bead 70' which is confined between axially facing surfaces 72', 74' on the structure 62. The bead 70' guides rotation of the threaded element 24" around the central axis 54' of the tubular fitting 22" at a fixed axial location.

An adaptor ring 104 surrounds the second end 58' of the tubular fitting 22"/threaded element 24". The threaded element 24" has an annular outer surface 106 which nests in an undercut 108 in the adaptor ring 104. The adaptor ring 104 is suitably fixed to the threaded element 24", as by an adhesive, or other means known to those skilled in the art. The adaptor ring 104 effectively extends the tubular fitting 22" axially to an end 112.

The second connecting assembly 18" has a sealing assembly 28" attached thereto. The sealing assembly 28" consists of annular body 114 with radially inturned, spaced ends 116, 118. The end 118 is defined by a wall 120 with a first sealing surface 76', facing in one axial direction, and an annular surface 122 facing axially oppositely to the first sealing surface 76'. The sealing assembly 28" further includes an O-ring 124 having a second sealing surface 80'.

The annular body 114 is snapped in place over the adaptor ring 104 so that the O-ring 124 and adaptor ring 104 are captive between the ends 116, 118. The O-ring 124 is in turn captive between the first surface 96' on the adaptor ring 104 and the surface 122 on the wall 120. The first surface 96' bears against a second surface 98' on the O-ring 124. The end 116 of the annular body 114 nests in a groove 84' on the threaded element 24", which thereby allows the annular body 114 to shift slightly axially relative to the threaded element 24"/tubular fitting 22".

As in the embodiment described in FIGS. 4–6, the port 14' is aligned with its central axis 30 coincident with the axis 54' in a pre-assembly state. The first free end 34 of the port 14' is thereafter directed axially through an entry opening 100' in the sealing assembly 28", to cause the threads 16' on the port 14' to engage the threads 26". The diameter D of the threads 16' is less than the diameter D2 of the second sealing surface 80' so that the port 14' can be directed to the FIG. 8 position without interference between the threads 16' and the second sealing surface 80'.

In the FIG. 8 position, the first sealing surface 76' is spaced from the axially facing surface 40 on the first connecting assembly 12'. By further rotating the threaded element 24" around the axis 54', the threads 16', 26" cooperate to advance the threaded element 24", from right to left in FIGS. 7–9, until the first sealing surface 76' abuts to the axially facing surface 40. At the moment that this occurs, the O-ring 124 is in a first, substantially undeformed, state, as shown in FIGS. 7 and 8. Continued rotation of the threaded element 24" to a secured position causes the first surface 96' to be advanced against the second surface 98' on the O-ring 124, with the first sealing surface 76' blocked against the axially facing surface 40 on the first connecting assembly 12'. This changes the O-ring 124 from the first, undeformed state, shown in FIGS. 7 and 8, to a deformed state, shown in FIG. 9. In the deformed state, the O-ring 124 is compressed so as to be squeezed, and thereby expanded radially inwardly as well as outwardly, so that the second sealing surface 80' engages and sealingly surrounds the unthreaded portion 38 of the radially outwardly facing surface 32 on the port 14'. At the same time, the axial pressure enhances the seal established between the first sealing surface 76' and the axially facing surface 40. With the threaded element 24" in the secured position of FIG. 9, the aforementioned two separate seals are established to prevent migration of foreign material to between the threads 16' 26". The connecting assembly 18" shown is incorporated into a standard connector nut with the addition of the special adaptor ring 104.

In FIGS. 10–12, a further modified form of second connecting assembly, according to the present invention, is shown at 18'". The second connecting assembly 18'" incorporates a combination of features from each of the second connecting assemblies 18', 18", previously described. That is, the second connecting assembly 18'"has a tubular fitting 22'''with threaded element 24''', similar to the threaded element 24', to include a radially enlarged portion 66' with an outer surface 68' to accommodate a wrench, and an axial extent comparable to that for the threaded element 24'. The threaded element 24'''has a groove 84" to accommodate an inturned end 116' on an annular body 114' of a sealing assembly 28'''. The sealing assembly 28''' is similar to the sealing assembly 28", to include a separate O-ring 124' that is captive between a wall 118' and a first surface 96" at the end 58" of the tubular fitting 22'''. The extension of the end 58" obviates the need for the adaptor ring 104 on the second connecting assembly 18".

The second connecting assembly 18''' cooperates with the first connecting assembly 12', as shown in FIGS. 11 and 12, in the same manner as does the second connecting element 18", as shown in corresponding FIGS. 8 and 9. By moving the threaded element 24''' from a position separated from the first connecting assembly 12' to the secured position therefor in FIG. 12, the second connecting assembly 18''' is sequentially changed from the FIG. 11 state into the FIG. 12 state, wherein the first sealing surface 76" is sealingly borne against the axially facing surface 40 and the O-ring 124' is compressed between the first surface 96" and wall surface 122'. The compressed O-ring 124' is deformed radially inwardly so that the second sealing surface 80" is sealingly borne against the unthreaded portion 38 of the radially outwardly facing surface 32 of the port 14'. With this configuration, the depicted threaded element 24''' can be incorporated with the annular body 114' and O-ring 124' into an otherwise standard connector assembly.

In FIGS. 13–15, a second connecting assembly is shown at 18''''. The second connecting assembly 18'''' is similar to the second connecting assembly 18" in FIGS. 7–9 with the exception that the threaded element 24'''' is made with an integral, axial extension 126 with an outturned end 128 which defines the first surface 96''' which bears directly upon a second surface 98'''. This obviates the need for the adaptor ring 104 on the second connecting assembly 18".

Additionally, the first surface 96''', in addition to squeezing the O-ring 124" against the surface 122", by reason of the line thereof, as indicated by L2 in FIG. 15, being non-orthogonal to the axis 54''', exerts a force generally in the direction of the arrow 130, with a radially inwardly directed component. The O-ring 124" otherwise cooperates with the threaded element 24'''' and annular body 114" in the same manner as do the threaded element 24" and annular body 114 on the second connecting assembly 18", shown in FIGS. 7–9, to produce the double seal i.e. between the first sealing surface 76''' and axially facing 40 on the first connecting assembly 12' and the second sealing surface 80''' and the unthreaded portion 38 of the radially outwardly facing surface 32 on the port 14'. The angled arrangement of the extension 126 results in the formation of a groove 84''' to allow for relative shifting between the sealing assembly 28'''' and the axial extension 126.

A multitude of designs for the threaded elements, other than those shown, ranging from near conventional, as shown in FIGS. 7 and 13, to completely unconventional, can be devised, none of which interferes with the basic seal and thread functionality. Other variations contemplated include multiple O-rings or specially molded or die-cut seal rings with non-circular cross sections.

The O-rings 124, 124', 124" are designed not to interfere with the threads 16' on the port 14'. The O-rings 124, 124', 124" begin to compress radially as the threaded elements 24", 24''', 24'''' approach the secured positions therefor. The O-rings 124, 124', 124" are constrained axially as well as radially to effect the desired sealing. Deformation is slight enough that the O-rings 124,124', 124" fully recover when the second connecting assemblies 18", 18''' and 18'''' are separated from the connecting assemblies 12', 12". All sealing surfaces can be made from a material, known to those skilled in this art, that produces seals with the desired integrity.

The foregoing disclosure of specific embodiments is intended to be illustrative of the broad concepts comprehended by the invention.

The invention claimed is:

1. In combination:
a) a first connecting assembly comprising:
a port having a central axis, a radially outwardly facing surface, a first free end, and a second end spaced axially from the first free end,
the port having threads on the radially outwardly facing surface; and
an axially facing surface; and
b) a second connecting assembly for operatively connecting a cable to the port on the first connecting assembly, the second connecting assembly comprising:
a tubular fitting having a central axis and axially spaced first and second ends,
the tubular fitting defining a receptacle for a cable at the first end of the tubular fitting,
the tubular fitting further comprising a threaded element with threads which can be engaged with the threads on the port to maintain the first and second connecting assemblies operatively engaged and thereby a cable in the receptacle in the tubular fitting operatively connected to the port; and
a sealing assembly,
the first and second connecting assemblies operatively engageable by i) relatively situating the first and second connecting assemblies in a pre-assembly state wherein the first and second connecting assemblies are separated from each other; ii) relatively moving the first and second connecting assemblies from the pre-assembly state to engage the threads on the port and threaded element; and iii) rotating at least one of the port and threaded element relative to the other of the port and threaded element to cause the threads on the port and threaded element to interact and thereby cause the threaded element to move axially relative to the port in a first direction from the first free end towards the second end of the port into a secured position,
the sealing assembly comprising a first sealing surface that abuts to the axially facing surface on the first connecting assembly with the threaded element in the secured position,
the sealing assembly comprising a sealing portion with a second sealing surface,
the sealing portion having a first state and a deformed state,
wherein the sealing portion is caused to be changed from the first state into the deformed state and the second sealing surface is caused to thereby be moved sealingly radially inwardly against the radially outwardly facing surface on the port as an incident of the threaded element moving in the first axial direction with the first sealing surface abutted to the axially facing surface of the first connecting assembly,
wherein the sealing assembly and tubular fitting are maintained together as a unitary assembly with the second connecting assembly separated from the first connecting assembly, the sealing assembly having a first axially facing shoulder and the tubular fitting having a third axially facing shoulder, the first and third axially facing shoulders abutting to each other to prevent the sealing assembly and tubular fitting from being separated from each other by relative axial movement.

2. The combination according to claim 1 wherein the sealing assembly defines a second shoulder facing axially oppositely to the first shoulder, the tubular fitting defines a fourth shoulder facing axially oppositely to the third shoulder, the first shoulder confronts the third shoulder to confine relative movement between the sealing assembly and tubular fitting in an axial direction towards each other and the second shoulder confronts the fourth shoulder to confine relative movement between the sealing assembly and tubular fitting in an axial direction away from each other.

3. The combination according to claim 1 wherein the tubular fitting comprises a radially outwardly opening annular groove and the sealing assembly comprises a radially inwardly projecting bead which extends into the annular groove.

4. The combination according to claim 1 wherein the sealing assembly is at the second end of the tubular fitting.

5. The combination according to claim 1 wherein the first and second sealing surfaces are both spaced axially fully from the threads on the threaded element.

6. The combination according to claim 4 wherein the first and second sealing surfaces are both spaced axially fully from the threads on the threaded element.

7. In combination:
a) a first connecting assembly comprising:
a port having a central axis, a radially outwardly facing surface, a first free end, and a second end spaced axially from the first free end,
the port having threads on the radially outwardly facing surface; and
an axially facing surface; and
b) a second connecting assembly for operatively connecting a cable to the port on the first connecting assembly, the second connecting assembly comprising:
a tubular fitting having a central axis and axially spaced first and second ends,
the tubular fitting defining a receptacle for a cable at the first end of the tubular fitting,
the tubular fitting further comprising a threaded element with threads which can be engaged with the threads on the port to maintain the first and second connecting assemblies operatively engaged and thereby a cable in the receptacle in the tubular fitting operatively connected to the port,
the threads on the threaded element bounding a first effective diameter; and
a sealing assembly,
the first and second connecting assemblies operatively engageable by i) relatively situating the first and second connecting assemblies in a pre-assembly state wherein the first and second connecting assemblies are separated from each other; ii) relatively moving the first and second connecting assemblies axially from the pre-assembly state to engage the threads on the port and threaded element; and iii) rotating at least one of the port and threaded element relative to the other of the port and threaded element to cause the threads on the port and threaded element to interact and thereby cause the threaded element to move axially relative to the port in a first direction from the first free end towards the second end of the port into a secured position, the sealing assembly comprising a first sealing surface that abuts to the axially facing surface on the first connecting assembly with the threaded element in the secured position, the sealing assembly comprising a sealing portion with a second sealing surface, the sealing portion having a first state and a deformed state, the second sealing surface having an inside effective diameter that is greater than the first effective diameter with the sealing portion in the first state, wherein the sealing portion is caused to be changed from the first state into the deformed state and the second sealing surface is caused to thereby be moved sealingly radially inwardly against the radially outwardly facing surface on the port as an incident of the threaded element moving in the first axial direction with the first sealing surface abutted to the axially facing surface of the first connecting assembly, wherein the threads on the port have a second effective diameter and with the sealing portion in the first state, the inside effective diameter is greater than the second effective diameter.

8. The combination according to claim 7 wherein the second sealing surface has an unthreaded, continuous annular shape.

9. The combination according to claim 7 wherein the tubular fitting has a first surface and the sealing assembly has a second surface and with the first sealing surface abutted to the axially facing surface of the first connecting assembly, continued movement of the threaded element in the first axial direction causes the first and second surfaces to interact to thereby change the sealing portion from the first state into the deformed state.

10. The combination according to claim 9 wherein at least one of the first and second surface, as viewed in cross section in a plane extending through the central axis of the tubular fitting, has a straight shape extending along a line that is not parallel to the central axis of the tubular fitting.

11. The combination according to claim 7 wherein the threaded element has a first cam surface and the sealing element has a second cam surface, and with the first sealing surface abutted to the axially facing surface of the first connecting assembly, continued movement of the threaded element in the first axial direction causes the first and second cam surfaces to interact so as to exert a radially inward force on the sealing portion as the sealing portion is changed from the first state into the deformed state.

12. In combination:
a) a first connecting assembly comprising:
a port having a central axis, a radially outwardly facing surface, a first free end, and a second end spaced axially from the first free end,
the port having threads on the radially outwardly facing surface; and
an axially facing surface; and
b) a second connecting assembly for operatively connecting a cable to the port on the first connecting assembly, the second connecting assembly comprising:
a tubular fitting having a central axis and axially spaced first and second ends,
the tubular fitting defining a receptacle for a cable at the first end of the tubular fitting,
the tubular fitting further comprising a threaded element with threads which can be engaged with the threads on the port to maintain the first and second connecting assemblies operatively engaged and thereby a cable in the receptacle in the tubular fitting operatively connected to the port, the threads on the threaded element bounding a first effective diameter; and a sealing assembly, the first and second connecting assemblies operatively engageable by i) relatively situating the first and second connecting assemblies in a pre-assembly state wherein the first and second connecting assemblies are separated from each other; ii) relatively moving the first and second connecting assemblies axially from the pre-assembly state to engage the threads on the port and threaded element; and iii) rotating at least one of the port and threaded element relative to the other of the port and threaded element to cause the threads on the port and threaded element to interact and thereby cause the threaded element to move axially relative to the port in a first direction from the first free end towards the second end of the port into a secured position, the sealing assembly comprising a first sealing surface that abuts to the axially facing surface on the first connecting assembly with the threaded element in the secured position, the sealing assembly comprising a sealing portion with a second sealing surface, the sealing portion having a first state and a deformed state, the second sealing surface having an inside effective diameter that is greater than the first effective diameter with the sealing portion in the first state, wherein the sealing portion is caused to be changed from the first state into the deformed state and the second sealing surface is caused to thereby be moved sealingly radially inwardly against the radially outwardly facing surface on the port as an incident of the threaded element moving in the first axial direction with the first sealing surface abutted to the axially facing surface of the first connecting assembly, wherein the tubular fitting has a first surface and the sealing assembly has a second surface and with the first sealing surface abutted to the axially facing surface of the first connecting assembly, continued movement of the threaded element in the first axial direction causes the first and second surfaces to interact to thereby change the sealing portion from the first state into the deformed state, wherein the sealing portion comprises an O-ring.

13. The combination according to claim 9 wherein the sealing assembly has a third surface and with the first sealing surface abutted to the axially facing surface of the first connecting assembly, continued movement of the threaded element in the first axial direction causes the sealing portion to be compressed between the first and third surfaces so as to expand radially inwardly to cause the second sealing surface to be moved radially inwardly sealingly against the radially outwardly facing surface on the port.

14. The combination according to claim 13 wherein the sealing assembly comprises a wall and the first sealing surface and third surface are defined by the wall and face axially oppositely to each other.

15. The combination according to claim 7 wherein the first and second sealing surfaces are defined by a single piece.

16. The combination according to claim 7 wherein the first and second sealing surfaces are defined by first and second separate discrete elements.

17. The combination according to claim 7 wherein the sealing assembly and tubular fitting are maintained together as a unitary assembly with the second connecting assembly separated from the first connecting assembly.

18. The combination according to claim 17 wherein the sealing assembly defines first and second axially oppositely facing shoulders, the tubular fitting defines third and fourth axially oppositely facing shoulders, the first shoulder confronts the third shoulder to confine relative movement between the sealing assembly and tubular fitting in an axial direction towards each other and the second shoulder confronts the fourth shoulder to confine relative movement between the sealing assembly and tubular fitting in an axial direction away from each other.

19. The combination according to claim 7 wherein the tubular fitting comprises a radially outwardly opening annular groove and the sealing assembly comprises a radially inwardly projecting bead which extends into the annular groove.

20. In combination:

a) a first connecting assembly comprising:

a port having a central axis, a radially outwardly facing surface, a first free end, and a second end spaced axially from the first free end, the port having threads on the radially outwardly facing surface; and an axially facing surface; and b) a second connecting assembly for operatively connecting a cable to the port on the first connecting assembly, the second connecting assembly comprising:

a tubular fitting having a central axis and axially spaced first and second ends, the tubular fitting defining a receptacle for a cable at the first end of the tubular fitting, the tubular fitting further comprising a threaded element with threads which can be engaged with the threads on the port to maintain the first and second connecting assemblies operatively engaged and thereby a cable in the receptacle in the tubular fitting operatively connected to the port; and a sealing assembly, the first and second connecting assemblies operatively engageable by i) relatively situating the first and second connecting assemblies in a pre-assembly state wherein the first and second connecting assemblies are separated from each other; ii) relatively moving the first and second connecting assemblies axially from the pre-assembly state to engage the threads on the port and threaded element; and iii) relatively rotating at least one of the port and threaded element relative to the other of the port and threaded element to cause the threads on the port and threaded element to interact and thereby cause the threaded element to move axially relative to the port in a first direction from the first free end towards the second end of the port into a secured position, the sealing assembly comprising a sealing portion with a first sealing surface, the sealing portion having a first state and deformed state, the tubular fitting having a first surface and the sealing assembly having a second surface, at least one of the first and second surfaces angled relative to the central axis in a manner so that an angle between the at least one of the first and second surfaces and central axis opens axially oppositely to the first axial direction and so that as the threaded element is moved in the first axial direction, the first and second surfaces cooperate to cause the first sealing surface to be wedged, through a force exerted directly on the at least one of the first and second surfaces that is angled and by reason of the one of the at least one of the first and second surfaces being angled, radially inwardly sealingly to against the radially outwardly facing surface on the port as the sealing portion is caused to be changed from the first state into the deformed state.

21. In combination:
a) a first connecting assembly comprising:
a port having a central axis, a radially outwardly facing surface, a first free end, and a second end spaced axially from the first free end,
the port having threads on the radially outwardly facing surface; and
an axially facing surface; and
b) a second connecting assembly for operatively connecting a cable to the port on the first connecting assembly, the second connecting assembly comprising:
a tubular fitting having a central axis and axially spaced first and second ends,
the tubular fitting defining a receptacle for a cable at the first end of the tubular fitting,
the tubular fitting further comprising a threaded element with threads which can be engaged with the threads on the port to maintain the first and second connecting assemblies operatively engaged and thereby a cable in the receptacle in the tubular fitting operatively connected to the port; and
a sealing assembly,
the first and second connecting assemblies operatively engageable by i) relatively situating the first and second connecting assemblies in a pre-assembly state wherein the first and second connecting assemblies are separated from each other; ii) relatively moving the first and second connecting assemblies axially from the pre-assembly state to engage the threads on the port and threaded element; and iii) relatively rotating at least one of the port and threaded element relative to the other of the port and threaded element to cause the threads on the port and threaded element to interact and thereby cause the threaded element to move axially relative to the port in a first direction from the first free end towards the second end of the port into a secured position,
the sealing assembly comprising a sealing portion with a first sealing surface,
the sealing portion having a first state and deformed state,
the tubular fitting having a first surface and the sealing assembly having a second surface,
at least one of the first and second surfaces angled relative to the central axis so that as the threaded element is moved in the first axial direction, the first and second surfaces cooperate to cause the first sealing surface to be wedged, through the at least one of the first and second surfaces that is angled, radially inwardly sealingly to against the radially outwardly facing surface on the port as the sealing portion is caused to be changed from the first state into the deformed state,
wherein the sealing portion comprises an O-ring.

22. The combination according to claim 20 wherein the sealing assembly comprises a second sealing surface which is abuttable to the axially facing surface of the first connecting assembly.

23. The combination according to claim 22 wherein the first and second sealing surfaces are defined by a single piece.

24. The combination according to claim 22 wherein the first and second sealing surfaces are defined by first and second separate discrete elements.

25. The combination according to claim 20 wherein the sealing assembly and tubular fitting are maintained together as a unitary assembly with the second connecting assembly separated from the first connecting assembly.

26. In combination:
a) a first connecting assembly comprising:
a port having a central axis, a radially outwardly facing surface, a first free end, and a second free end spaced axially from the first free end,
the port having threads on the radially outwardly facing surface; and
an axially facing surface; and
b) a second connecting assembly for operatively connecting a cable to the port on the first connecting assembly, the second connecting assembly comprising:
a tubular fitting having a central axis and axially spaced first and second ends,
the tubular fitting defining a receptacle for a cable at the first end of the tubular fitting,
the tubular fitting further comprising a threaded element with threads which can be engaged with the threads on the port to maintain the first and second connecting assemblies operatively engaged and thereby a cable in the receptacle in the tubular fitting operatively connected to the port; and
a sealing assembly,
the first and second connecting assemblies operatively engageable by i) relatively situating the first and second connecting assemblies in a pre-assembly state wherein the first and second connecting assemblies are separated from each other, ii) relatively moving the first and second connecting assemblies axially from the pre-assembly state to engage the threads on the port and threaded element; and iii) relatively rotating at least one of the port and threaded element relative to the other of the port and threaded element to cause the threads on the port and threaded element to interact and thereby cause the threaded element to move axially relative to the port in a first direction from the first free end towards the second end of the port into a secured position,
the sealing assembly comprising a first sealing surface that abuts to the axially facing surface on the first connecting assembly with the threaded element in the secured position,
the sealing assembly comprising a sealing portion with a second sealing surface,
the sealing portion having a first state and a deformed state,
wherein the sealing portion is caused to be changed from the first state into the deformed state and the second sealing surface is thereby caused to be moved radially inwardly sealingly against the radially outwardly facing surface on the port as an incident of the threaded element moving in the first axial direction with the first sealing surface abutted to the axially facing surface of the first connecting assembly,
wherein the tubular fitting has a first surface and as the threaded element is moved in the first axial direction with the first sealing surface abutted to the axially facing surface of the first connecting assembly, the sealing portion of the sealing assembly is compressed between the first surface and the axially facing surface of the first connecting assembly so as to expand and thereby cause the second sealing surface to be moved radially inwardly sealingly against the radially outwardly facing surface on the port, the sealing assembly having first and second axially oppositely facing shoulders and the tubular fitting having first and second axially oppositely facing shoulders, the first and third shoulders confronting each other to confine relative movement between the sealing assembly and tubular fitting in an axial direction towards each other, the second and fourth shoulders confronting each other to confine relative movement between the sealing assembly and tubular fitting in an axial direction away from each other.

27. The combination according to claim 26 wherein the sealing assembly comprises a wall which is abuttable to the axially facing surface of the first connecting assembly, the wall having a third surface facing oppositely to the axially facing surface of the first connecting assembly, and the sealing portion of the sealing assembly is compressed between the first and third surfaces as the second sealing surface is caused to be moved radially inwardly sealingly against the radially outwardly facing surface on the port.

28. The combination according to claim 26 wherein at least one of the first and second surfaces, as viewed in cross-section in a plane extending through the central axis of the tubular fitting, has a straight shape extending along a line that is not parallel to the central axis of the tubular fitting.

29. In combination:
a) a first connecting assembly comprising:
a port having a central axis, a radially outwardly facing surface, a first free end, and a second free end spaced axially from the first free end,
the port having threads on the radially outwardly facing surface; and
an axially facing surface; and
b) a second connecting assembly for operatively connecting a cable to the port on the first connecting assembly, the second connecting assembly comprising:
a tubular fitting having a central axis and axially spaced first and second ends,
the tubular fitting defining a receptacle for a cable at the first end of the tubular fitting,
the tubular fitting further comprising a threaded element with threads which can be engaged with the threads on the port to maintain the first and second connecting assemblies operatively engaged and thereby a cable in the receptacle in the tubular fitting operatively connected to the port; and
a sealing assembly,
the first and second connecting assemblies operatively engageable by i) relatively situating the first and second connecting assemblies in a pre-assembly state wherein the first and second connecting assemblies are separated from each other, ii) relatively moving the first and second connecting assemblies axially from the pre-assembly state to engage the threads on the port and threaded element; and iii) relatively rotating at least one of the port and threaded element to cause the threads on the port and threaded element to interact and thereby cause the threaded element to move axially relative to the port in a first direction from the first free end towards the second end of the port into a secured position, the sealing assembly comprising a first sealing surface that abuts to the axially facing surface on the first connecting assembly with the threaded element in the secured position, the sealing assembly comprising a sealing portion with a second sealing surface, the sealing portion having a first state and a deformed state, wherein the sealing portion is caused to be changed from the first state into the deformed state and the second sealing surface is thereby caused to be moved radially inwardly by substantially deforming the sealing portion to thereby cause the second sealing surface to be moved into contact with and sealingly against the radially outwardly facing surface on the port as an incident of the threaded element moving in the first axial direction with the first sealing surface abutted to the axially facing surface of the first connecting assembly, wherein the tubular fitting has a first surface and as the threaded element is moved in the first axial direction with the first sealing surface abutted to the axially facing surface of the first connecting assembly, the sealing portion of the sealing assembly is compressed between the first surface and the axially facing surface of the first connecting assembly so as to expand and thereby cause the second sealing surface to be moved radially inwardly sealingly against the radially outwardly facing surface on the port, wherein the sealing portion comprises an O-ring.

30. The combination according to claim 26 wherein the first and second sealing surfaces are defined by a single piece.

31. The combination according to claim 26 wherein the first and second sealing surfaces are defined by first and second separate discrete elements.

32. The combination according to claim 26 wherein the sealing assembly and tubular fitting are maintained together as a unitary assembly with the second connecting assembly separated from the first connecting assembly.

33. In combination:
a) a first connecting assembly comprising:
a port having a central axis, a radially outwardly facing surface, a first free end, and a second end spaced axially from the first free end,
the port having threads on the radially outwardly facing surface; and
an axially facing surface; and
b) a second connecting assembly for operatively connecting a cable to the port on the first connecting assembly, the second connecting assembly comprising:
a tubular fitting having a central axis and axially spaced first and second ends,
the tubular fitting defining a receptacle for a cable at the first end of the tubular fitting,
the tubular fitting further comprising a threaded element with threads which can be engaged with the threads on the port to maintain the first and second connecting assemblies operatively engaged and thereby a cable in the receptacle in the tubular fitting operatively connected to the port; and
a sealing assembly comprising a sealing portion,
there being means cooperating between the first and second connecting assemblies for causing the sealing portion to be deformed radially inwardly into contact with the radially outwardly facing surface and so as to sealingly engage the radially outwardly facing surface on the port and the sealing assembly to sealingly engage the axially facing surface on the first connecting assembly as an incident of the threaded element and port being relatively rotated to cause the threaded element to advance in a first axial direction from the first free end of the port towards the second end of the port, the sealing assembly having first and second axially oppositely facing shoulders and the tubular fitting having third and fourth axially oppositely facing shoulders, the first and third shoulders confronting each other to confine relative movement between the sealing assembly and tubular fitting in an axial direction towards each other, the second and fourth shoulders confronting each other to confine relative movement between the sealing assembly and tubular fitting in an axial direction away from each other.

34. A method of operatively connecting a cable to a port, the method comprising the steps of:

providing a first connecting assembly comprising: a) a port with a central axis, a radially outwardly facing surface having threads thereon, a first free end, and a second end spaced axially from the first free end and b) an axially facing surface;

providing a second connecting assembly comprising a) tubular fitting with a central axis and axially spaced first and second ends and comprising a threaded element with threads and b) a sealing assembly having a sealing portion;

aligning the first and second connecting assemblies in a pre-assembly state with the first and second connecting assemblies separated from each other;

relatively axially moving the first and second connecting assemblies to engage the threads on the port and the tubular fitting;

rotating at least one of the port and threaded element relative to the other of the port and threaded element to cause the threads to interact and thereby cause the threaded element to move axially relative to the port in a first direction from the first free end towards the second free end; and as an incident of moving the threaded element axially in the first direction, causing the sealing portion to be deformed radially inwardly into contact with the outwardly facing surface on the port to engage sealingly with the outwardly facing surface on the port, wherein the step of causing the sealing portion to be deformed radially inwardly comprises causing the sealing portion to be changed from a) a first state wherein the entire sealing surface is spaced from the outwardly facing surface on the port into b) a deformed state wherein the sealing surface is pressed against the outwardly facing surface on the port.

35. The method of operatively connecting a cable to a port according to claim 34 further comprising the step of causing the sealing assembly to sealingly engage the axially facing surface on the first connecting assembly as an incident of moving the threaded element axially in the first direction.

36. The method of operatively connecting a cable to a port according to claim 34 wherein the step of causing the sealing portion to be deformed radially inwardly comprises producing a compressive axial force on the sealing portion to cause the sealing portion to be deformed radially inwardly.

37. The method of operatively connecting a cable to a port according to claim 34 wherein the step of causing the sealing portion to be deformed radially inwardly comprises producing an axial compressive force on the sealing portion between the second connecting assembly and a part of the sealing assembly.

38. The method of operatively connecting a cable to a port according to claim 34 wherein the step of providing a second connecting assembly comprises providing a tubular fitting and sealing assembly that are maintained together as a unitary assembly with the second connecting assembly separated from the first connecting assembly.

39. A cable connecting assembly for connection to a port, the cable connecting assembly comprising:

a sealing assembly; and a tubular fitting for receiving a cable and having a central axis, the sealing assembly comprising a first sealing surface facing axially relative to the central axis and a second sealing surface facing radially relative to the central axis, each to sealingly engage a port to which the cable connecting assembly is connected, the tubular fitting comprising a cylindrical body with internal threads to engage a port to which the cable connecting assembly is connected and a surface facing radially outwardly relative to the central axis, the cylindrical body and sealing assembly having a cooperating groove and bead, one each on the radially outwardly facing surface of the cylindrical body and the sealing assembly, to maintain the sealing assembly and the tubular fitting together as a unitary assembly preparatory to connecting the cable connecting assembly to a port.

40. The cable connecting assembly according to claim 39 in combination with a port with external threads that engage the internal threads and wherein as the internal and external threads are engaged, the second sealing surface is urged with a progressively increasing sealing force against the port.

41. The cable connecting assembly according to claim 39 wherein there are two cooperating pairs of shoulders that abut to limit opposite relative axial movement between the cylindrical body and sealing assembly.

42. A sealing assembly for use with a coaxial connector for connection to a port having a central axis, the sealing assembly comprising:

a cylindrical body at one end of the coaxial connection, the cylindrical body having an internal surface, at least a portion of which is threaded, and an external surface, a groove and bead, provided one each on the sealing assembly and external surface of the cylindrical body, the bead extending into the groove with the sealing assembly and cylindrical body in a pre-assembled state wherein the sealing assembly and cylindrical body are maintained together as a unitary assembly, the sealing assembly having a first port sealing surface facing axially relative to the central axis and a second port sealing surface facing radially relative to the central axis.

43. The cable connecting assembly according to claim 42 wherein there are two cooperating pairs of shoulders that abut to limit opposite relative axial movement between the cylindrical body and sealing assembly.

44. The cable connecting assembly according to claim 42 wherein the cylindrical body is configured to accommodate a conventional wrench to facilitate turning of the cylindrical body around the central axis.

45. The cable connecting assembly according to claim 44 wherein the external surface of the cylindrical body comprises at least two flat surfaces that can be engaged by a conventional wrench.

46. The cable connecting assembly according to claim 42 in combination with a port with external threads that engage the internal threads and wherein as the internal and external threads are engaged, the second sealing surface is urged with a progressively increasing sealing force against the port.

* * * * *

UNITED STATES PATENT AND TRADEMARK OFFICE
CERTIFICATE OF CORRECTION

PATENT NO.         : 7,264,503 B2
APPLICATION NO. : 10/614487
DATED              : September 4, 2007
INVENTOR(S)        : Noah Montena Page 1 of 1

It is certified that error appears in the above-identified patent and that said Letters Patent is hereby corrected as shown below:

Col. 21, lines 7-9 should read as follows the sealing assembly having first and second axially
  oppositely facing shoulders and the tubular fitting having
  third and fourth axially oppositely facing shoulders, Signed and Sealed this Fifteenth Day of April, 2008

JON W. DUDAS
*Director of the United States Patent and Trademark Office*